Reissued Feb. 27, 1940 Re. 21,373

UNITED STATES PATENT OFFICE 21,373

CATALYTIC FORMATION OF LONG-CHAIN ALDEHYDES

Wilbur A. Lazier, New Castle, Del., assignor to E. I. du Pont de Nemours & Company, Wilmington, Del., a corporation of Delaware No Drawing. Original No. 2,178,761, dated November 7, 1939, Serial No. 27,375, June 19, 1935. Application for reissue January 5, 1940, Serial No. 312,620

15 Claims. (Cl. 260—603)

This invention relates to the preparation of aldehydes by the catalytic dehydrogenation of long-chain alcohols and the use in said reactions of novel compound dehydrogenation catalysts of refractory character and high degree of activity.

This case is a continuation in part of U. S. application Serial No. 456,298 filed May 27, 1930, now Patent No. 2,077,421, and U. S. application Serial No. 713,922 filed March 3, 1934.

The catalytic dehydrogenation of the simpler organic hydroxy compounds such as aliphatic alcohols in the preparation of aldehydes and ketones was carried out by Sabatier and his coworkers as early as 1903. Since this date other investigators have continued this work along much the same lines. Various processes for dehydrogenating alcohols to aldehydes and ketones have been disclosed in the patent literature but for the most part they are characterized by the use of specific catalysts not related to those included in the following specification, and are confined principally to the vapor phase dehydrogenation of the more volatile alcohols such as ethyl alcohol and do not disclose the dehydrogenation of alcohols having more than eight carbon atoms.

A number of metals and their oxides have been employed as catalysts in the dehydrogenation processes of the prior art. Zinc, copper, and nickel, and their oxides have probably been used most successfully, but numerous disadvantages accompany the use of most of these catalysts. Reducible oxides and their metals, although possessing relatively high activity at low temperature, are nevertheless susceptible to sintering or poisoning. Difficultly reducible oxides, such as zinc oxide, while more refractory and less susceptible to poisoning, are also less active and require relatively high temperatures in order to activate them.

The processes disclosed in the prior art are definitely limited to vapor phase reactions and therefore to hydroxy compounds having sufficiently high vapor pressures to permit their conversion to the vapor phase before coming into contact with a catalytic surface.

It has now been found, however, that by the use of certain novel and highly active catalysts of a refractory nature, the dehydrogenation of long-chain alcohols of low volatility can be successfully accomplished either in the vapor or liquid phase without appreciable pyrolytic decomposition of the materials used.

This invention has as an object the application of certain highly active catalysts to the dehydrogenation of organic hydroxy compounds. A further object is to provide a process for the dehydrogenation of long-chain alcohols of relatively low volatility by means of highly efficient catalysts. Other objects will appear hereinafter.

These objects are accomplished by the following invention, a detailed description of which is given below. In its general aspects, the invention comprises bringing an alcohol into contact with a dehydrogenation catalyst under suitable conditions whereby hydrogen is removed with the formation of aldehydes or ketones. The catalyst may comprise a dehydrogenating metal intimately associated with an acidic oxide of a metallic element of the fifth or sixth groups of the periodic system, the element being in the lower valence state. As catalysts for this process I prefer to use the various chromites such as are described in my U. S. Patents Numbers 1,964,000 and 1,964,001, and in my copending application Serial No. 456,298.

Several examples are given below which illustrate the manner in which this invention is applied, but they are in no way to be regarded as limitations.

*Example I*

A copper chromite catalyst was prepared as follows: 426 parts by weight of copper nitrate and 176 parts of chromic acid were dissolved in 2750 parts of distilled water, and copper ammonium chromate was precipitated by adding 88 parts of anhydrous ammonia, with stirring, during a period of 15 to 30 minutes. The precipitate thus formed was filtered, washed once with distilled water and dried at 100° to 110° C. It was then ignited at 500° C. for four hours to decompose the copper ammonium chromate to copper chromite. The chromite residue was then extracted twice by agitating for 15 minutes in a solution of 200 parts of glacial acetic acid in 1800 parts of water. After washing thoroughly, the copper chromite was filtered and dried at 100° C.

Dodecyl alcohol (245 g.) was heated with vigorous stirring with copper chromite (10 g.) prepared as described above for 19 hours at a temperature of 230° to 243° C., and a pressure of one atmosphere. Hydrogen was evolved in an amount representing 60% dehydrogenation of the primary hydroxyl group. Analysis of the product revealed the presence of aldehydes and esters amounting to about 16% of dodecanal and 50% dodecyl laurate.

*Example I–A*

Eighty-one grams of hexamethylene glycol was mixed with 8 g. of copper chromite prepared as described in Example I and heated to 200° to 235° C. under an open reflux condenser for 5.3 hours. Evolution of hydrogen occurred to an extent that indicated a 55% conversion to the corresponding dialdehyde. Examination of the product, however, revealed the formation of the lactone of ω-hydroxyhexanoic acid as the major product.

Under similar conditions decamethylene glycol was dehydrogenated to a tough rubber-like polymeric ester. Likewise, octadecanediol yielded hydrogen to the extent of 44% of the theoretical value and gave unidentified liquid products probably analogous to those formed from the other glycols.

*Example II*

A zinc chromite catalyst promoted with the chromites of copper and cadmium was prepared as follows: 982 g. of zinc nitrate ($6H_2O$), 96.6 g. of copper nitrate ($3H_2O$) and 23.1 g. of cadmium nitrate ($4H_2O$) were mixed, dissolved in water, and the solution was made up to a volume of two liters. 504 g. of ammonium bichromate was dissolved in about 1500 cc. of water and 243 cc. of 28% aqueous ammonia was added with stirring, after which the solution was made up to two liters. The ammonium chromate solution was added with stirring to the solution of metallic nitrates, and an additional 250 cc. of 28% aqueous ammonia was added to neutralize the mother liquor. The precipitate thus formed was washed five times by decantation, filtered, dried, and ignited at 400° C. for four hours to form the mixed chromites of zinc, copper, and cadmium. The ignited product was briquetted and crushed to 8–14 mesh granules.

Five cc. of the catalyst prepared as described was supported between plugs of glass wool in a vertical glass reaction tube and reduced in the stream of hydrogen at 375° C. for three hours, after which dodecyl alcohol was vaporized, preheated to 375° C. and passed over the catalyst at atmospheric pressure at the rate of 69 cc. of alcohol per hour. The amount of hydrogen evolved amounted to 56.6% dehydrogenation of the alcohol and the product obtained, contained by analysis, 0.4% lauric acid, 7.5% dodecyl laurate, and 36.5% of dodecanal, the remainder being unchanged dodecyl alcohol.

*Example III*

A zinc chromite catalyst was prepared as follows: 1750 g. of zinc nitrate was dissolved in water and the solution was made up to a volume of 3 liters. To this was added 3 liters of a solution containing 912 g. of ammonium chromate with constant stirring. 250 cc. of 28% aqueous ammonia was then added. The resulting precipitate was washed three times by decantation, filtered, dried at 110° C. and heated at 400° C. for four hours. The product thus obtained was briquetted and crushed to 8 to 14 mesh granules.

Five cc. of the catalyst thus prepared was supported between plugs of glass wool in a vertical glass reaction tube, and heated to 400° C. Octyl alcohol was then vaporized and passed over the catalyst at atmospheric pressure, at the rate of 30 cc. of liquid alcohol per hour, whereby 64.5% of the alcohol was converted to octanal.

*Example IV*

A catalyst consisting of a mixture of zinc and copper chromites in the ratio of 2 moles of zinc to 1 mole of copper was prepared by adding to a 2 molar solution of zinc and copper nitrates in the ratio specified, an equal volume of 2 molar ammonium chromate. The slurry thus formed was neutralized by adding 28% aqueous ammonia and the precipitate was washed by decantation, filtered, dried, and heated at 400° C. for four hours. The product so formed was briquetted into pellets $\frac{3}{16}''$ in diameter and $\frac{3}{16}''$ long.

Nineteen liters of the catalyst was placed in a steel converter and heated to 385° C. Decyl alcohol was then vaporized at the rate of two liters per hour, and the vapor was preheated and passed over the catalyst under atmospheric pressure. A copious evolution of gas occurred, amounting to 24 cubic feet per hour measured at standard conditions, containing about 90% hydrogen. The liquid condensate obtained was found by distillation to contain approximately 50% of decanal.

*Example V*

A mixture of alcohols obtained by catalytic synthesis from carbon monoxide and hydrogen, having a distillation range of 160° to 200° C. and consisting principally of seven, eight, and nine carbon primary alcohols was vaporized and passed over nineteen liters of the catalyst described in Example IV above at 400° C. and atmospheric pressure. A copious evolution of gas occurred amounting to about 29 cubic feet per hour and consisting principally of hydrogen. The liquid condensate contained approximately 30% of aldehydes comprising essentially heptanal, octanal, and nonanal.

Although in the above examples certain definite conditions of temperature, pressure, duration of the reaction, amount of materials, etc., have been indicated, it will be apparent that these values can be considerably varied within the scope of the invention, and are largely governed by the properties of the compounds, the catalysts selected for carrying out the dehydrogenation, and whether the reaction is to be carried out in the vapor or liquid phase. The processes described in this invention are operative in the temperature range from 50° to 450° C. If the reaction is to be carried out in the liquid phase with catalysts particularly designed for this method, the preferred temperatures ordinarily fall between the limits of 200° to 300° C. If carried out in the vapor phase, however, a temperature range extending from 350° to 450° C. is usually preferred. The range of pressures employed may vary from sub-atmospheric pressure to such pressures as are necessary to overcome the vapor pressures of the materials treated. It will, perhaps, seldom be necessary to use pressures in excess of 50 atmospheres, and ordinarily for practical purposes atmospheric pressure is to be desired. Although in certain cases super-atmospheric pressures may be employed, such pressures are ordinarily to be avoided since they are likely to inhibit the dehydrogenation or to result in the formation of aldehyde or ketone condensation products or other high boiling materials.

In its broadest aspects this invention comprises the use in the dehydrogenation of organic hydroxy compounds, of chromite catalysts either promoted or unpromoted and prepared as described below, and in the examples given. These catalysts may be prepared by heating mixtures of compounds containing one or more dehydrogenating metals whose oxides are reducible by hydrogen, one or more dehydrogenating metals whose oxides are difficultly or not at all reducible by hydrogen, and hexavalent chromium, to a temperature sufficient to cause the hexavalent chromium compound to be reduced substantially to the trivalent form. For example I may heat a mixture of copper chromate and zinc chromate at red heat in order to drive off oxygen and form a mixture of copper oxide, zinc oxide, copper chromite and zinc chromite. The more convenient and preferred method, however, consists of co-precipitating multiple chromates of the reducible and non-reducible oxides with ammonium chromate whereby double ammonium chromates are formed which decompose exothermically to the chromite when heated to about 400° C.

By dehydrogenating metals and oxides is meant those metals and oxides which under proper conditions are capable of causing the addition of hydrogen to such compounds as ketones, aldehydes, and olefins or are capable of the abstraction of hydrogen from organic hydroxy compounds such as primary or secondary alcohols with the formation of aldehydes or ketones. By difficultly reducible oxides I mean those remaining substantially unreduced after several hours exposure in a pure state to the action of hydrogen at 400° C. Reducible oxides, on the other hand, are those which are readily converted under the same conditions to the elementary metals and water vapor. As suitable dehydrogenating metals, forming difficultly reducible oxides, may be mentioned zinc, manganese, and magnesium. Dehydrogenating metals which may be used as promoters, and whose oxides are readily reducible, are silver, copper, lead, tin, bismuth, cadmium, iron, cobalt and nickel.

In the case of liquid phase dehydrogenation where the reaction temperatures involved are relatively low, I may prefer to use the chromite of one or more of the reducible oxides.

In vapor phase dehydrogenation, which ordinarily requires higher temperatures, a more refractory catalyst is desirable, in which case I prefer to use chromites of the difficultly reducible oxides, such as zinc oxide, either alone or promoted with one or more of the chromites of the reducible oxides, such as the oxides of copper or cadmium.

The chromite catalyst compositions used in this invention may be characterized as finely divided refractory materials, which may be obtained in the form of either finely divided powders or granular products which contain chromium sesquioxide intimately associated or combined with a substantial proportion of one or more dehydrogenating metals. Base metal oxides may or may not be present in excess of the amount necessary to form a chromite with chromium oxide. The term chromite as herein used does not necessarily refer to a compound of definite chemical composition, since the chromite in the sense of this invention may contain widely different proportions of its components and yet be substantially combined. The test applied for determining chemical combination consists of acid extraction, which will remove substantially all of the uncombined base metal oxides in purely physical mixtures.

The catalysts of this invention are applicable to a wide variety of catalytic reactions, but particularly those involving the hydrogenation or dehydrogenation of organic compounds. They are particularly suitable for the dehydrogenation of alcohols, either in the liquid or vapor phase and at ordinary or higher pressures. This invention is applicable to the dehydrogenation of the alcoholic compounds in general, and is particularly applicable to long-chain primary monohydric alcohols containing more than eight carbon atoms such as dodecyl, octadecyl, and 9,10-octadecenyl alcohols, and primary dihydric alcohols such as hexamethylene and decamethylene glycols, as well as glycols containing both primary and secondary carbinols such as octadecanediol.

The above description and examples are to be taken as illustrative only and not as limiting the scope of the invention. Any modification or variations therefrom which conform to the spirit of the invention are intended to be included within the scope of the claims.

I claim:

1. A process for the dehydrogenation of an aliphatic long-chain primary alcohol to the corresponding aldehyde which comprises the step of bringing said alcohol into contact with a catalyst comprising a dehydrogenating metal intimately associated with chromium sesqui-oxide at a pressure less than 50 atmospheres and at a temperature within the range of 50° and 450° C., said temperature being sufficiently elevated to cause the evolution of hydrogen.

2. A process for the dehydrogenation of an aliphatic long-chain primary alcohol to the corresponding aldehyde which comprises the step of bringing said alcohol into contact with a catalyst comprising a dehydrogenating metal combined with chromium sesqui-oxide at a pressure less than 50 atmospheres and at a temperature within the range of 50° and 450° C., said temperature being sufficiently elevated to cause the evolution of hydrogen.

3. A process for the dehydrogenation of an aliphatic long-chain primary alcohol to the corresponding aldehyde which comprises the step of bringing said alcohol into contact with a catalyst comprising a chromite of a dehydrogenating metal at a pressure less than 50 atmospheres and at a temperature within the range of 50° and 450° C., said temperature being sufficiently elevated to cause the evolution of hydrogen.

4. A process for the dehydrogenation of an aliphatic long-chain primary alcohol to the corresponding aldehyde which comprises the step of bringing said alcohol into contact with a catalyst comprising a chromite of a dehydrogenating metal at a pressure less than 50 atmospheres and at a temperature within the range of 50° and 450° C., said temperature being sufficiently elevated to cause the evolution of hydrogen, and said catalyst being prepared by the ignition of a double chromate of a dehydrogenating metal and ammonia.

5. A process for the dehydrogenation of an aliphatic long-chain primary alcohol to the corresponding aldehyde which comprises the step of bringing said alcohol into contact with a catalyst comprising copper chromite at a pressure less than 50 atmospheres and at a temperature within the range of 50° and 450° C., said temperature being sufficiently elevated to cause the evolution of hydrogen.

6. A process for the dehydrogenation of an aliphatic long-chain primary alcohol to the corresponding aldehyde which comprises the step of bringing said alcohol into contact with a catalyst comprising essentially a mixture of the chromites of zinc, copper, and cadmium, at a pressure less than 50 atmospheres and at a temperature within the range of 50° and 450° C., said temperature being sufficiently elevated to cause the evolution of hydrogen.

7. A process for the dehydrogenation of an aliphatic long-chain primary alcohol to the corresponding aldehyde which comprises the step of bringing said alcohol into contact with a catalyst comprising a chromite of at least one reducible oxide of a dehydrogenating metal, at a pressure less than 50 atmospheres and at a temperature within the range of 50° and 450° C., said temperature being sufficiently elevated to cause the evolution of hydrogen.

8. A process for the dehydrogenation of an aliphatic long-chain primary alcohol to the corresponding aldehyde which comprises the step of bringing said alcohol into contact with a catalyst comprising a chromite of at least one difficultly reducible oxide of a dehydrogenating metal, at a pressure less than 50 atmospheres and at a temperature within the range of 50° and 450° C., said temperature being sufficiently elevated to cause the evolution of hydrogen.

9. A process for the dehydrogenation of an aliphatic long-chain primary alcohol to the corresponding aldehyde which comprises the step of bringing said alcohol into contact with a catalyst comprising a chromite of at least one difficultly reducible oxide of a dehydrogenating metal associated with a chromite of at least one reducible oxide of a dehydrogenating metal, at a pressure less than 50 atmospheres and at a temperature within the range of 50° and 450° C., said temperature being sufficiently elevated to cause the evolution of hydrogen.

10. A process for the dehydrogenation of an aliphatic long-chain primary alcohol to the corresponding aldehyde which comprises contacting said alcohol in the liquid phase at a pressure less than 50 atmospheres and at a temperature of about 200° to 300° C. with a catalyst comprising a chromite of at least one reducible oxide.

11. A process for the dehydrogenation of an aliphatic long-chain primary alcohol to the corresponding aldehyde which comprises contacting said alcohol in the gas phase at a pressure less than 50 atmospheres and at a temperature of about 350° to 450° C., with a catalyst comprising a chromite of at least one difficultly reducible oxide.

12. A process for the dehydrogenation of an aliphatic long-chain primary alcohol to the corresponding aldehyde which comprises contacting said alcohol in the gas phase at a pressure less than 50 atmospheres and at a temperature of about 350° to 450° C. with a catalyst comprising at least one difficultly reducible oxide associated with a chromite of at least one reducible oxide.

13. A process for the dehydrogenation of dodecyl alcohol to dodecanal which comprises passing dodecyl alcohol over a catalyst comprising a dehydrogenating metal intimately associated with chromium sesqui-oxide at a pressure less than 50 atmospheres and at a temperature between 50° and 450° C., said temperature being sufficiently elevated to cause the evolution of hydrogen.

14. A process for the dehydrogenation of dodecyl alcohol to dodecanal which comprises passing dodecyl alcohol over a catalyst composition comprising essentially a mixture of the chromites of zinc, copper and cadmium at a pressure approximating atmospheric and at a temperature of about 375° C.

15. A process for the dehydrogenation of an aliphatic long-chain primary alcohol to the corresponding aldehyde which comprises the step of bringing said alcohol into contact with a catalyst comprising a dehydrogenating metal intimately associated with chromium sesqui-oxide at a pressure less than 50 atmospheres and at a temperature within the range of 200° to 450° C.

WILBUR A. LAZIER.